April 3, 1934.     C. L. CAMPBELL     1,953,745
HYDROLYSIS OF HALOGEN DERIVATIVES OF HYDROCARBONS
Filed March 24, 1928
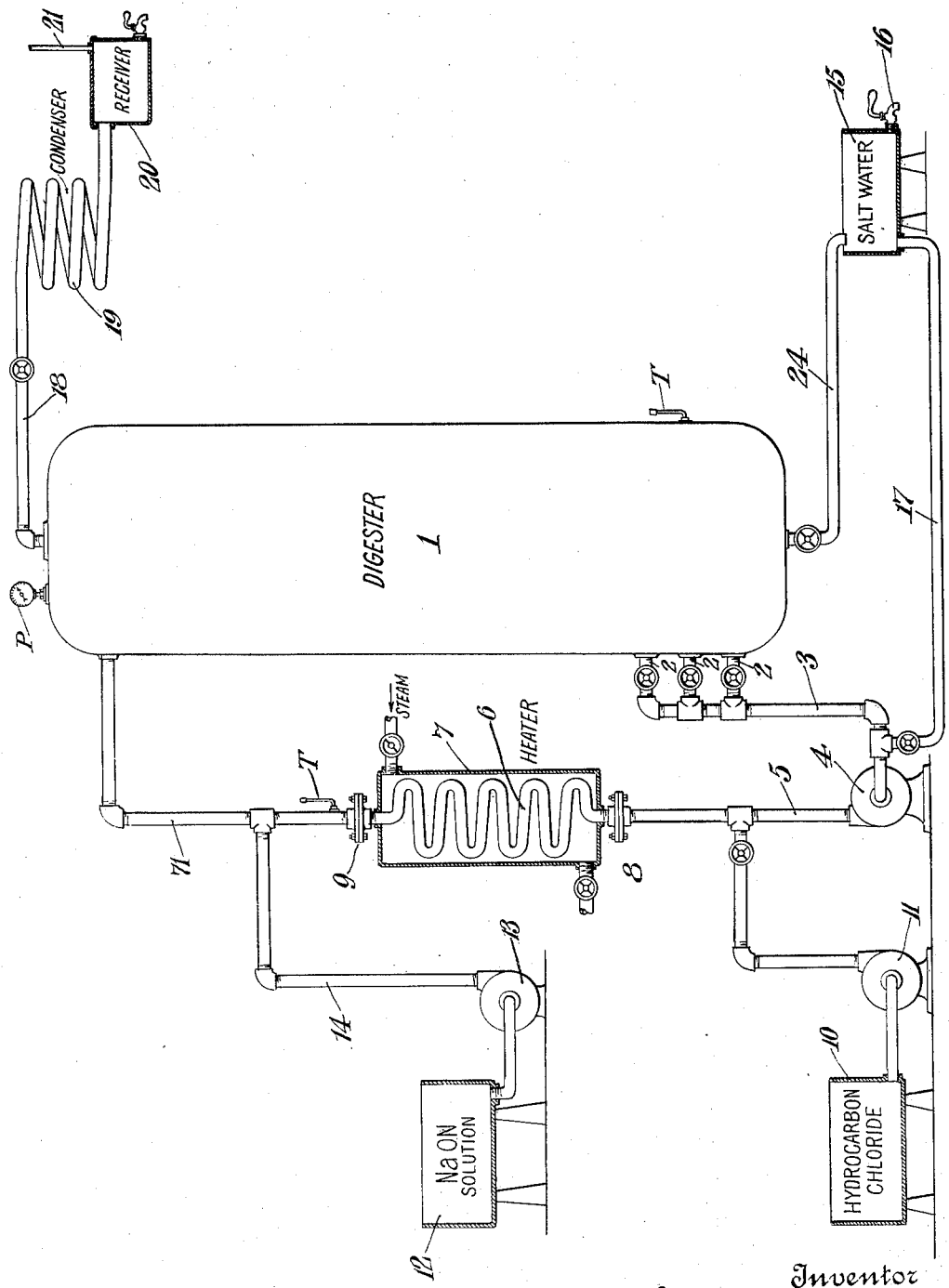

Patented Apr. 3, 1934

1,953,745

UNITED STATES PATENT OFFICE 1,953,745

HYDROLYSIS OF HALOGEN DERIVATIVES OF HYDROCARBONS

Charles L. Campbell, Boston, Mass., assignor to E. B. Badger & Sons Company, Boston, Mass., a corporation of Massachusetts Application March 24, 1928, Serial No. 264,331

10 Claims. (Cl. 260—156)

This invention relates to a method and apparatus for carrying out chemical reactions, particularly in cases in which the reacting substances are to be agitated and heated. My invention is particularly advantageous in carrying out chemical reactions in which acids or other corrosive reagents or constituents are used or occur incidentally or result from the reaction and in which additional quantities of substances are added to the reacting mass while residual products are taken off during the reaction in the form of liquids or solutions or vapors.

My invention is particularly applicable in the hydrolysis of halogen derivatives of hydrocarbons, and especially in the hydrolysis of chlorine derivatives of hydrocarbons of the paraffin series, such as propane, butane, pentane, and hexane. In carrying out such hydrolysis inadvertent decomposition results in the production of hydrochloric acid and perhaps other acid or corrosive substances, particularly at the point at which necessary quantities of heat are supplied to the reacting mass; and in such reactions agitation of the reacting mass is desirable and it is desirable to add additional quantities of the chlorine product and of a hydrolyzing agent, and it is desirable to withdraw in vapor phase the product of the hydrolyzing reaction and to withdraw other substances in the form of liquids or solutions.

In the practice of my invention the desired reaction may be carried out in a reaction chamber conveniently termed a "digester" and the necessary agitation is obtained by withdrawing some of the mixture of the reacting substances from the lower part of the digester and introducing them into the upper part and it is convenient to introduce into the reacting mass additional quantities of reagents and substances to be acted upon, by introducing them into the external circuit extending from the lower part of the digester to the upper part thereof.

An important object of my invention resides in concentrating at the point where least injury will result and at a point where unavoidable injury is most readily repaired, such corrosion as is unavoidable and which ordinarily is most rapid or violent at the point of highest temperature or the point of heat supply. In accordance with my invention, therefore, I supply heat to the mixture of reacting substances while they are passing through the external circuit from the lower part of the digester to the upper part thereof. To this end I include in such external circuit, a heater constructed of such materials as will best resist corrosion by acid or corrosive substances used in or incidental to or resulting from the reaction; and I prefer that such heater shall be so installed as to be readily replaceable.

The hydrolysis of the monochlorides of hydrocarbons of the paraffin series having four to six or seven carbon atoms, to produce corresponding alcohols, is an operation of such difficulty that very careful procedure is necessary to its success; and the procedure must be well suited to the operation and it must be a procedure whereby complete control of widely varying conditions can be exercised to prevent improper procedure that tends to occur and to produce undesirable, particularly unsaturated, compounds. In other words apparatus for such reactions must be carefully designed and capable of maintaining full control over the reaction in order to prevent it from diverging into improper lines which produce undesired substances.

The chief object of my invention is to provide a method and apparatus whereby such hydrolyzing reactions may be successfully carried out commercially; and by the practice of my invention such reactions, particularly hydrolysis of amyl chloride, have been carried out commercially on an extensive scale.

In a process carried out as suggested by Eugene E. Ayres, Jr., and Erling H. Haabestad, such chlorine derivatives are hydrolyzed to produce alcohol by converting them in the presence of water into an ester of a substantially water-insoluble fatty acid, and then treating the ester with a hydrolyzing agent such as sodium hydroxide or by heating the chlorine derivatives and sodium hydroxide in the presence of water and an ester comprising the basic radical of the derivative and the acid radical of a substantially water-insoluble fatty acid. In such a reaction the mixture of reacting substances is heated and salt water and vapors of the derivatives and of the hydrolyzed substances are withdrawn from the reaction.

In accordance with my invention such reaction mixtures are withdrawn from the lower part of the digester and pumped through a heater and returned to the upper portion of the digester and fresh quantities of chlorine derivatives are introduced into such an external circuit ahead of the heater and additional quantities of the reagent such as sodium hydroxide are introduced into the external circuit between the heater and the point where the circuit leads the mixture back into the digester.

Such hydrolysis of chlorine derivatives can be carried out by the practice of my invention in such a manner and with such control that the prevention of the formation of undesirable substances is ensured to such a degree that the hydrolyzing operation is successful commercially.

To assist in the understanding of my invention I have shown diagrammatically in the single figure of the drawing, apparatus embodying my invention and whereby my process may be practiced, with the understanding that my invention is not limited to the apparatus shown but includes such modifications and variations thereof as fall within the spirit of my invention.

In the apparatus shown a digester 1 may be constructed in any manner and of such material as is well suited to the reaction that is to be carried out. The mixture of reacting substances may be withdrawn from any one of several suitable levels near the lower end of the digester 1, for example by the valved pipes 2 which connect with the pipe 3 which leads to the inlet of pump 4. Pipe 5 leads from pump 4 to heating coil 6 of suitable material that may be heated in any manner as by being surrounded by a jacket 7 supplied with steam. From the heating coil 6, pipe 7 leads back to the upper part of the digester. Detachable connections 8 and 9 permit ready removal and replacement of the heater in the external circuit so formed. Material to be heated may be kept in tank 10 and passed by pump 11 into pipe 5 of the external circuit ahead of the heater 6. Reagent kept in tank 12 may be passed by pump 13 through pipe 14 into pipe 7 or any part of the external circuit between the heater and the upper part of the digester. Heavy liquids and solutions may be withdrawn from the bottom of the digester by valved pipe 24 and collected in tank 15 from which liquids may be drained by drain cock 16 and from which substances may be passed back into the digester by pipe 17 leading to pipe 3. Vapors may be withdrawn from the digester by pipe 18 and condensed in condenser 19, liquid being collected in tank 20 and uncondensed vapors being vented through pipe 21 which may be provided with any suitable recovering means to prevent losses.

As an illustrative example of the application of my invention amyl oleate and water may be contained in the digester and amyl chloride in tank 10 and sodium hydroxide in tank 12. By circulating the contents of the digester through heater 6 by means of pump 4 the temperature in the digester is brought to a temperature of 100° C. to 150° C. and the pressure will vary between 30 pounds and 200 pounds gauge pressure. The introduction of amyl chloride and sodium hydroxide is begun and from time to time salt water is withdrawn through pipe 24. Vapors of amyl alcohol and amyl chloride together with small quantities of amylene and higher chlorides of pentane pass out through pipe 18. During this operation the temperature in the digester may rise to 150° C. and the pressure to 200 pounds gauge pressure. The temperature on the outlet side of the heater may rise to 160° C. The withdrawal of salt water is so carried out that salt water is never circulated in the external circuit and the continuous withdrawal of vapors is so carried out as to keep the pressure up to 175 pounds gauge pressure.

After the charging of the digester is completed the circulation of the mixture in the external circuit may be stopped for a few minutes to permit separation of the salt water. Distillation from the contents of the digester is regulated by adjustment of valve 25 in pipe 18 and is carried on as rapidly as possible, preferably maintaining a pressure of at least 50 pounds gauge pressure. Any soap passing out with the salt water may be returned to the digester and the reaction may be continued with fresh supplies of amyl chloride and sodium hydroxide, which latter may be in the form of cell liquor. The apparatus is conveniently provided with suitable valves and with the thermometers T and pressure gauge P.

I claim:

1. In the hydrolysis of liquid chlorine derivatives of hydrocarbons of the paraffin series by means of an alkaline solution in the presence of an ester having a basic radical the same as that of the derivative and an acid radical of a substantially water insoluble fatty acid, the process comprising maintaining a main body of a mixture of the chloride and the alkaline solution and the ester, continuously withdrawing from a lower level of said body a portion of said mixture and returning said portion to an upper level of said body, supplying heat to said portion between its withdrawal from and its return to said body, and supplying fresh quantities of alkaline solution and chloride to said body by introducing them into said portion between its withdrawal from and its return to said body.

2. In the hydrolysis of liquid chlorine derivatives of hydrocarbons of the paraffin series by means of an alkaline solution in the presence of an ester having a basic radical the same as that of the derivative and an acid radical of a substantially water insoluble fatty acid, the process comprising maintaining a main body of a mixture of the chloride and the alkaline solution and the ester, continuously withdrawing mixture from a lower level of said main body and returning it to an upper level of said body, supplying heat to the externally circulating mixture, supplying fresh quantities of chloride to the externally circulating mixture between the point at which it leaves the main body thereof and the point at which heat is supplied thereto, and supplying fresh quantities of alkaline solution to the externally circulating mixture between the point at which heat is supplied thereto and the point at which the externally circulating mixture is returned to the main body.

3. In the hydrolysis of liquid chlorine derivatives of hydrocarbons of the pariffin series by means of an alkaline solution in the presence of an ester having a basic radical the same as that of the derivative and an acid radical of a substantially water insoluble fatty acid, the process comprising maintaining a main body of a mixture of the chloride and alkaline solution and ester, maintaining an external circulation of the mixture from a lower level of the body thereof to an upper level of the body thereof, and supplying heat and fresh quantities of chloride and alkaline solution to the externally circulating mixture.

4. In the hydrolysis of liquid chlorine derivatives of hydrocarbons of the paraffin series by means of an alkaline solution in the presence of an ester having a basic radical the same as that of the derivative and an acid radical of a substantially water insoluble fatty acid, the process comprising maintaining a main body of a mixture of the chloride and alkaline solution and ester, maintaining an external circulation of the mixture from a lower level of the body thereof to an upper level of the body thereof, supplying heat and fresh quantities of chloride and alkaline solution to the externally circulating mixture, and withdrawing salt water from the bottom of said body of mixture and withdrawing vapors of the chloride and of the hydrolyzed product from the top of said body.

5. In the hydrolysis of amyl chloride by the heating of amyl chloride in the presence of an alkaline solution and amyl ester of a substantially water insoluble fatty acid, the process comprising maintaining a main body of the mixture of amyl chloride and alkaline solution and the amyl ester, maintaining an external circulation of the mixture from a lower level of the main body thereof to an upper level of said main body, supplying heat to the externally circulating mixture, supplying fresh quantities of amyl chloride to the externally circulating mixture between the point at which it leaves the main body thereof and the point at which heat is supplied thereto, and supplying fresh quantities of alkaline solution to the externally circulating mixture between the point at which heat is supplied thereto and the upper level of the main body of the mixture.

6. In the hydrolysis of liquid chlorine derivatives of hydrocarbons of the paraffin series by means of an alkaline solution in the presence of an ester having a basic radical the same as that of the derivative and an acid radical of a substantially water-insoluble fatty acid, the process comprising maintaining a main body of a mixture of the chloride and the alkaline solution and the ester, maintaining an external circulation of the mixture from one level of the body thereof to another level of the body thereof, supplying heat and fresh quantities of the derivative and of the alkaline solution to the externally circulating mixture.

7. In the hydrolysis of amyl chloride by the heating of amyl chloride in the presence of an alkaline solution and amyl ester of a substantially water insoluble fatty acid, the process comprising maintaining a main body of the mixture of amyl chloride and alkaline solution and the amyl ester, maintaining an external circulation of the mixture from a lower level of the main body thereof to an upper level of said main body and supplying heat and fresh quantities of alkaline solution and fresh quantities of amyl chloride to that part of the mixture which is circulating externally of the main body thereof.

8. In the hydrolysis of amyl chloride by the heating of amyl chloride in the presence of an alkaline solution and amyl ester of a substantially water insoluble fatty acid, the process comprising maintaining a main body of the mixture of amyl chloride and alkaline solution and the amyl ester, maintaining an external circulation of the mixture from a lower level of the main body thereof to an upper level of said main body, supplying heat and fresh quantities of alkaline solution and fresh quantities of amyl chloride to that part of the mixture which is circulating externally of the main body thereof, withdrawing salt water from the bottom of said main body of mixture, and withdrawing vapors of amyl chloride and amyl alcohol from the top of said main body.

9. In the hydrolysis of liquid chlorine derivatives of hydrocarbons by means of an alkaline solution in the presence of an ester having a basic radical the same as that of the derivative and an acid radical of a substantially water-insoluble fatty acid, the process comprising maintaining a main body of a mixture of the chloride and the alkaline solution and the ester, maintaining an external circulation of the mixture with respect to said main body and supplying heat and fresh quantities of the derivative and of the alkaline solution to the externally circulating mixture.

10. In the hydrolysis of liquid chlorine derivatives of hydrocarbons by means of a hydrolyzing agent, the process comprising maintaining a main body of a mixture of the chloride and the agent, maintaining an external circulation of the mixture with respect to said main body, and supplying heat and fresh quantities of the derivative and of the alkaline solution to the externally circulating mixture.

CHARLES L. CAMPBELL.